Dec. 7, 1926.
L. W. LAWSON
FISHHOOK
Filed July 12, 1926
1,609,519
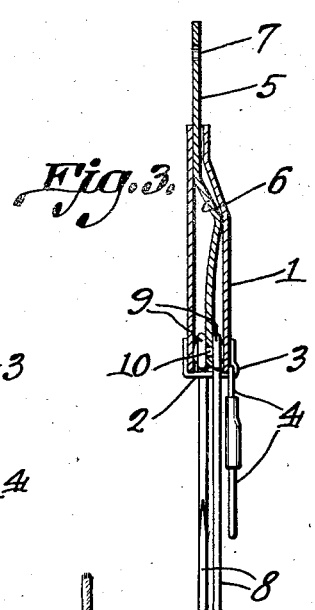
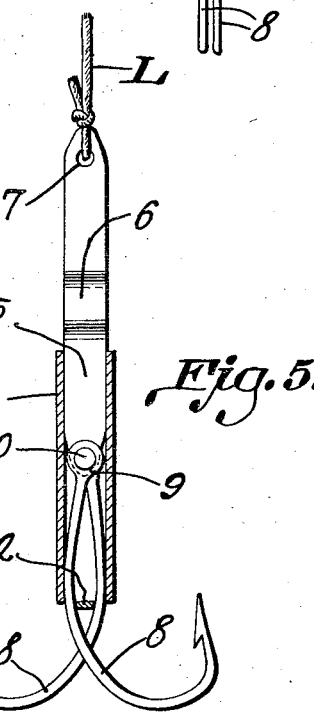
L. W. Lawson Inventor
By C. A. Snow & Co.
Attorneys Patented Dec. 7, 1926.

1,609,519

UNITED STATES PATENT OFFICE.

LLOYD WILLIAM LAWSON, OF CLINTON, IOWA.

FISHHOOK.

Application filed July 12, 1926. Serial No. 121,987.

This invention relates to a fish hook, one of the objects being to provide a means whereby when a fish strikes the bait, the pull produced on the line will result in shifting relatively movable hooks one or both of which will engage the fish and hold it from escaping.

Another object is to provide a device of this character which, when cast, will not become entangled in weeds, rocks and the like but can be manipulated safely, the hooks being held in retracted position until the bait is struck as before explained.

With the foregoing and other objects in view which will appear as the description proceeds, the invention resides in the combination and arrangement of parts and in the details of construction hereinafter described and claimed, it being understood that changes in the precise embodiment of the invention herein disclosed may be made within the scope of what is claimed without departing from the spirit of the invention.

In the accompanying drawings the preferred form of the invention has been shown.

In said drawings,

Figure 1 is a side elevation of the device showing the hooks in their normal or retracted positions.

Figure 2 is an edge view thereof.

Figure 3 is a section on line 3—3, Figure 1, the hooks and bait holding loop being shown in elevation.

Figure 4 is a transverse section through the casing of the hook, said section being on the line 4—4, Figure 2.

Figure 5 is a view similar to Figure 4 showing the hooks extended as a result of the pull upon the line.

Referring to the figures by characters of reference 1 designates a tubular casing having a cross piece 2 at one end constituting a spreader. This cross piece is preferably provided with an eye 3 at one side of the tubular casing and in which is mounted a loop 4 adapted to engage and hold the bait. This loop can be in the form of a safety pin as shown.

Slidably mounted within the tubular casing is a spring strip 5 having an intermediate offset portion 6 adapted to provide a sliding contact with one wall of the casing so as to hold the spring in frictional engagement with the tubular casing. One end of this spring strip is adapted to be connected to the line L which can be threaded through an opening 7 in the strip. To the other end of the spring strip are pivotally connected fish hooks 8, the shanks of these hooks being formed with eyes 9 which are attached to the strip 5 by means of a pivot stud 10.

The parts are so shaped and proportioned that when the eyes 9 are located close to the cross piece 2, the hooks are drawn together in lapping relation as shown in Figures 1 and 4, the lower end of the casing 1 cooperating with the cross piece 2 to maintain the hooks in these positions. The bait is attached to the loop 4 and the line L is attached to the strip 5. The parts are maintained in these relative positions because of the frictional contact of the offset portion 6 with the casing 1. Thus the line can be cast in the usual manner and the hooks can be manipulated back and forth below the surface of the water without becoming hung on rocks, weeds or the like. However, when a fish strikes at the bait the casing 1 will be drawn downwardly relative to the strip 5 and the hooks 8 with the result that the lower end of the casing will slide along the shanks of the hooks and cause the points thereof to swing apart to the positions shown in Figure 5. Thus one or both of the hooks will catch the fish.

What is claimed is:

1. The combination with a tubular casing and bait holding means connected to one end thereof, of a spring strip slidably mounted within the casing for attachment to a fishing line, fish hooks pivotally connected to said strip and extending in opposite directions from one end of the casing, said hooks being disposed normally with their points retracted, the casing and shank portions of the hooks cooperating during the relative movement of the strip and casing for shifting said hooks in opposite directions to project them laterally beyond the casing.

2. The combination with a tubular casing, and means for detachably fastening bait thereto, of a spring strip slidable longitudinally within the casing and having an intermediate offset portion for frictional engagement with the casing, said strip constituting means for attachment to one end of a fishing line, hooks having their shank portions pivotally connected to the strip, said hooks being oppositely disposed with their points normally retracted toward each other, said casing being shiftable onto the shanks of the hooks to move the hooks in opposite directions respectively thereby to project said points in opposite directions respectively to active position.

In testimony that I claim the foregoing as my own, I have hereto affixed my signature.

LLOYD WILLIAM LAWSON.